Figure 1:
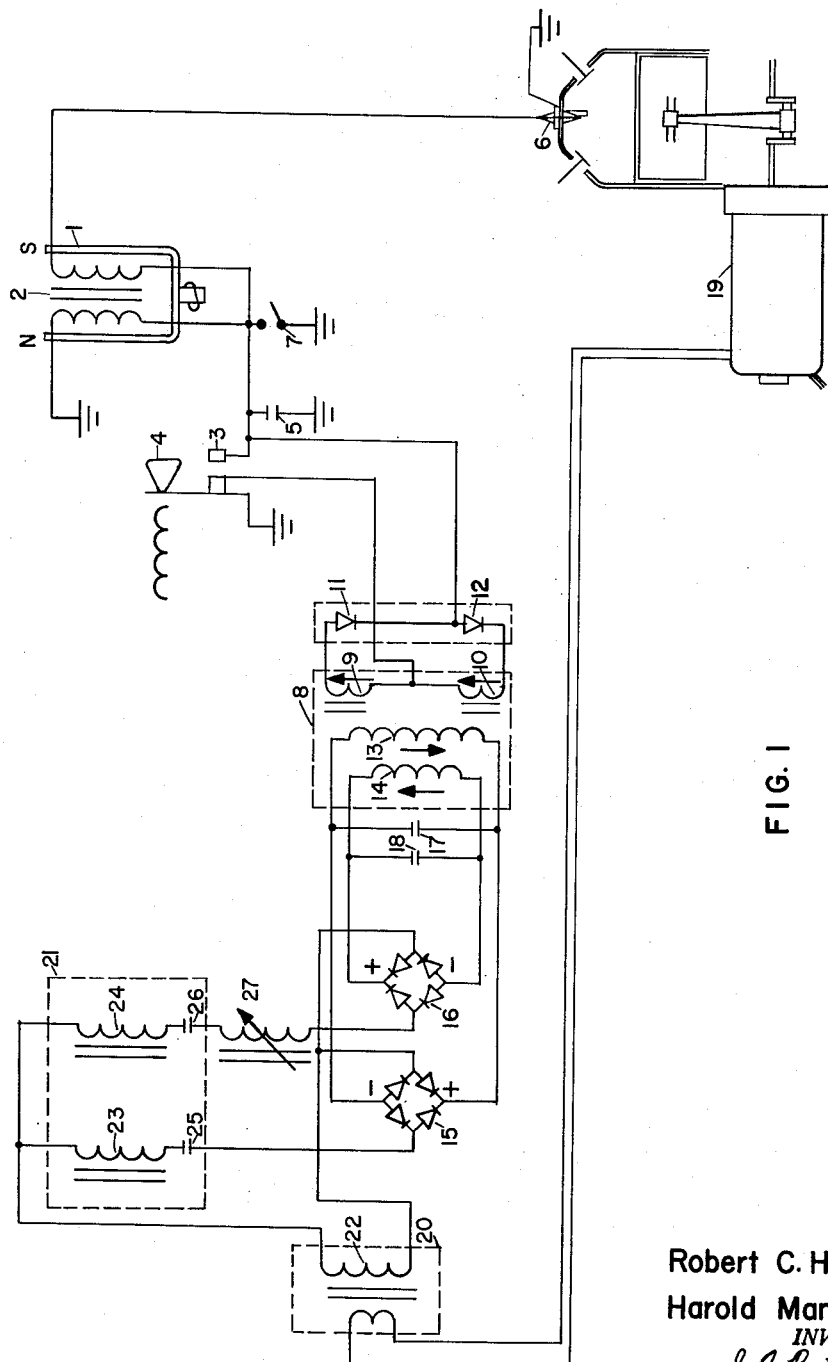

July 3, 1962

R. C. HAMILTON ETAL 3,042,836

ENGINE SPEED REGULATOR

Filed Nov. 20, 1959

2 Sheets-Sheet 1

Robert C. Hamilton,
Harold Mandroian,
INVENTORS

BY S. J. Rotondi
A. J. Dupont
C. A. Phillips,

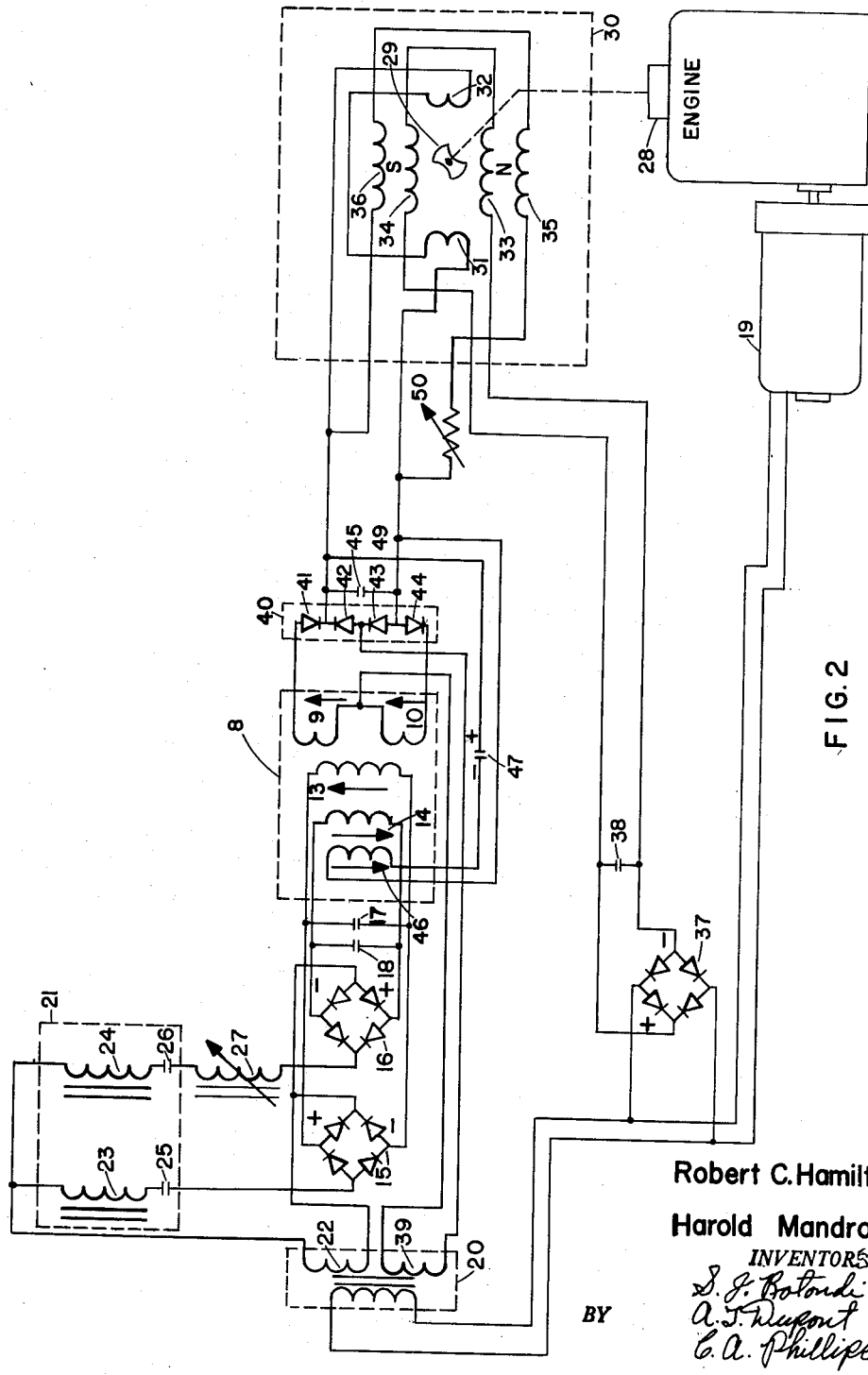

United States Patent Office 3,042,836
Patented July 3, 1962

3,042,836
ENGINE SPEED REGULATOR
Robert C. Hamilton, Pasadena, and Harold Mandroian, La Canada, Calif., assignors to the United States of America as represented by the Secretary of the Army
Filed Nov. 20, 1959, Ser. No. 854,525
6 Claims. (Cl. 317—5)

This invention relates in general to means for improving the regulation of the speed of internal combustion engines and particularly to a magnetic amplifier system for achieving speed control.

Many more applications would exist for internal combustion engines if the speed could be controlled precisely. Conventional speed governors are chiefly mechanical, hydraulic, electro-hydraulic, or electrical-mechanical in nature. In the case of a diesel engine speed control can be achieved by regulating the fuel injection through its normal throttle linkage with a mechanical governor. In the case of an internal combustion engine having magneto or induction-coil ignition, control may be achieved by a centrifugal switch operating on the ignition circuit, or by a mechanical governor controlling the throttle. None of these methods is capable of controlling the speed of an engine to a precision better than about 2 percent. Furthermore, these methods are susceptible to failure because of the use of a number of moving parts.

Accordingly, it is an object of this invention to provide a more precise frequency regulator for internal combustion engines.

It is a further object of this invention to provide a precise frequency regulator for internal combustion engines which will have a reduced number of moving parts.

This invention, together with further objects and advantages thereof, will best be understood by reference to the following description and accompanying drawing in which:

FIGURE 1 shows a schematic circuit diagram of an embodiment of the invention as employed to control the speed of an engine by controlling its ignition system; and FIGURE 2 shows a schematic circuit diagram of an embodiment of the invention as employed to control engine speed by controlling the rate of flow of a combustible element or elements of the fuel mixture being supplied the engine.

In accordance with the invention an alternating current generator is connected to the rotating shaft of the internal combustion engine to be controlled. The output of this alternator is fed separately through two frequency sensitive circuits and rectified, after which the resulting two voltages are applied to separate control windings of a saturable reactor to provide opposing flux forces in the core of the reactor. These resonant circuits are respectively tuned to pass a frequency just above and just below the frequency of the alternating current generator corresponding to the desired engine speed. The reactor also is provided with an output winding and, accordingly, it presents a high impedance to any applied variable control current when the alternator is operating at the desired frequency. Above or below the desired frequency, core saturation occurs and a low impedance is presented to the control current as long as the polarization of the control current is not such as to have a desaturating effect. By proper choice of the polarization of the control current the speed control may operate to "hold-up" or "hold-down" speed through control of an engine speed determining element. Supplementary means may be employed (if not inherent in the engine design) to effect a contra speed influence, i.e. a supplementary "hold-up" speed control if the reactor control is employed as a "hold-down" speed control. In this way the engine speed may be held within the sensitive control range of the reactor speed control.

Referring to FIGURE 1, a rotating permanent magnet 1 serves to produce a changing magnetic flux in the primary of an ignition coil 2. In series with this coil is a pair of breaker points 3 actuated by a cam 4 which is driven by the engine. A capacitor 5 and a switch 7 are in parallel with the breaker points 3. The secondary of the ignition coil is connected between ground and the spark plug 6. In order to control the speed of the engine, a saturable reactor 8 has its output windings 9 and 10 connected in parallel across the breaker points 3. Diodes 11 and 12 are connected in the output circuit to form a full-wave rectifier. The input coils 13 and 14 of the saturable reactor are fed by full-wave rectifiers 15 and 16 respectively. These are connected in such a way that the magnetic fields produced in the reactor by current from the two rectifiers are opposing. Identical filter capacitors 17 and 18 are in parallel with the rectifiers 15 and 16 for the purpose of reducing the ripple voltage.

The power necessary to operate the magnetic amplifier is furnished by a permanent magnet alternator 19, although it will be appreciated that any other type of alternator will also serve this purpose. Depending on the alternator used, a power transformer 20 may be added to change the voltage of the alternator to match the input impedance of the magnetic amplifier. A discriminator 21 is connected in series with the secondary 22 of the power transformer; the discriminator may consist of two series-tuned circuits made up of inductance and capacitance. The choice of the inductors 23, 24 and capacitors 25, 26 will determine the operating speed of an engine having an alternator with a given number of poles. Each series-tuned circuit feeds only one of the magnetic-amplifier input rectifiers. A variable inductance 27 is shown series-connected in either filter circuit to permit an adjustment of the frequency of that filter and thus the operating speed.

The operation of this system may be described as follows: The rotating permanent magnet 1 induces a voltage in the primary of the induction coil 2. The engine-driven cam 4 opens the breaker points 3 in the primary of the induction coil, and the primary current is interrupted after it has charged the capacitor 5. This sudden decrease in the primary current causes the electro-magnetic field surrounding the induction coil to collapse very rapidly and induce a high voltage in the secondary which causes the spark to jump the gap in the spark plug 6 igniting the fuel-air mixture in the engine. If a switch 7 were to short the breaker points 3, the primary current would not induce a secondary voltage. The output windings (on center tapped winding) of the saturable reactor 8 are similarly connected across the breaker points, and if the saturation level of the reactor is controlled as a function of engine speed the effect will be that of a set of parallel contacts that are opened or closed as a function of engine speed.

The saturation level is controlled as a function of engine speed by adjusting the series-tuned circuits so that the current is at a maximum through inductor 23 and capacitor 25 at a frequency slightly less than that corresponding to the desired operating speed, and the current is at a maximum through inductor 24 and capacitor 26 at a frequency slightly (substantially like amount) greater. Thus, the cross-over or canceling effect of these two circuits in the reactor 8 is balanced at the desired operating speed. When the engine is overspeeding, the reactor effectively shorts the breaker-point contacts and the primary current is not interrupted when the contacts open. Thus, no high voltage is induced in the secondary to fire the spark plug, the engine does not fire, and the engine cycle acts as a powerful brake to slow down the engine and hold it on speed. When the engine is below speed the spark plug fires in the normal manner (tending to bring the speed back up) because the core of the reactor does not saturate when the points open due to the opposition of flux produced by winding 13 with that produced by winding 9 or 10.

Reference is now made to FIGURE 2 which shows the control of an engine (gasoline, diesel, etc) by a precision frequency governor actuating a servo motor metering the fuel intake. The engine to be controlled has a flow control 28 controlled by a servo motor 30, consisting of a rotor 29 which is magnetically actuated by a pair of coils 31 and 32 (which tend to produce an increase in fuel flow), a pair of coils 33 and 34 (which tend to produce a decrease in fuel flow), and a pair of coils 35 and 36 (which act to oppose the action of coils 33 and 34, resulting in increased torque motor gain).

Coils 33 and 34 are connected in series with each other and are supplied with D.-C. from the alternator 19 by means of full-wave rectifier 37. A filter capacitor 38 is connected across the rectifier. A power rectifier 40 consisting of diodes 41, 42, 43, and 44 is connected across the output windings 9 and 10 of the reactor 8 in such a way that the current in these windings flows in only one direction. The output current is controlled by the saturation level of the reactor 8. A filter capacitor 45 is connected across the output of the rectifier 40. The input circuit to the reactor 8 is substantially the same as in the precision frequency governor for a magneto ignition system, shown in FIGURE 1 and previously described. However, the reactor 8 has, in addition, an antihunt winding 46 which is coupled by means of a series capacitor 47 to the output of the magnetic amplifier at points 48 and 49. Similarly connected across the output of the magnetic amplifier is a bucking circuit consisting of a rheostat 50, coil 35, and coil 36 connected in series.

The operation of the precise frequency governor shown in FIGURE 2 may be described as follows: The alternator 19 is connected to the engine and driven at a speed directly proportional to the engine speed. The frequency generated by the alternator 19 is directly proportional to its speed and that of the engine to which it is attached. The electrical output of the alternator goes to the transformer 20. The secondary 22 applies the transformed alternator voltage and frequency to the discriminator 21 and its two series-tuned circuits made up of the inductors 23 and 24, capacitors 25 and 26, full-wave rectifiers 15 and 16, and reactor control windings 13 and 14. The choice of these inductors and capacitors will determine, by shifting the cross-over null of the L-C circuits with respect to frequency, the speed of an engine driving an alternator with a fixed number of poles. Each series-tuned circuit feeds only one of the magnetic-amplifier input rectifiers and its associated reactor control winding. The two reactor control windings 13 and 14 buck one another and act to raise the saturation flux level as the engine speed falls below the desired speed which causes a shift up in the filtered output voltage that is applied to the torque-motor control windings 31, 32, 35, and 36. The effect is to bring the speed back up to the desired speed. The voltage applied to the torque-motor control windings 33 and 34 is directly proportional to alternator speed, and produces a speed retarding effect to tend to hold down speed.

The flow control 28 is directly connected to the rotor 29 of the torque motor 30. This fuel-valve rotor which control the flow of fuel and speed of the engine is positioned as a direct function of frequency error by the torque-motor rotor 29. In this manner accurate speed control of the engine may be accomplished.

While the foregoing is a description of the preferred embodiment, the following claims are intended to include those modifications and variations that are within the spirit and scope of our invention.

We claim:
1. A speed control for an internal combustion engine comprising an alternator driven by said engine, first and second electrical filters, said first filter being tuned to pass a signal just below a desired frequency output of said alternator and said second filter benig tuned to pass a signal just above said desired frequency, first, second, third and fourth rectifiers, a saturable reactor comprising first, second, and third windings, said third winding having a center tap, an output of said alternator being connected through said first filter and said first rectfiier to said first winding, an output of said alternator being connected through said second filter and said second rectifier to said second winding, said third and fourth rectifiers being connected in series across said third winding and being poled for unidirectional current flow through said third winding in a first direction, a source of control current being connected between control connections comprising a first connection to said center tap and a second connection made between said series connected third and fourth rectifier elements, said reactor having predetermined characteristics of either operating in the saturated or unsaturated regions responsive to the frequency output of said alternator, said third winding providing a substantial short circuit to said source of control current when said reactor is saturated and a high impedance when said reactor is unsaturated, said reactor being unsaturated at the desired frequency output and saturated at other than the desired frequency output of said alternator, and a speed determining means of said engine being electrically coupled to said third winding and responsive to the impedance of said third winding.

2. The speed control set forth in claim 1 further comprising an ignition system including a pair of breaker points which are connected between said connections.

3. The speed control set forth in claim 1 further comprising fifth and sixth rectifiers connected in series with said third and fourth rectifiers and poled for current flow in an opposite direction to that of said third and fourth rectifiers, said fifth rectifier being connected between said third rectifier and said second connection, and said sixth rectifier being connected between said fourth rectifier and said second connection, said source of current being an alternating current source, an electrical valve control means for regulating the fuel intake to said engine, said control means being energized by connection to a first electrical terminal between said third and fifth rectifiers and a second electrical terminal between said fourth and sixth rectifiers.

4. The speed control set forth in claim 3 wherein said electrical valve control means comprises an electrical servo motor and a fuel valve actuated by said motor, said servo motor comprising a first torque winding connected across said terminals, and said alternating current source being said alternator.

5. The speed control set forth in claim 4 wherein said servo motor further comprises a second torque winding connected to said alternator through a seventh rectifier and producing a torque counter to that produced by said first torque winding.

6. The speed control set forth in claim 5 further comprising a third torque winding connected through a variable resistor across said terminals and producing a torque in the direction of that produced by said first torque winding, an anti-hunt winding on said reactor connected through a capacitor to said terminals, filter capacitors being respectively connected across the output of said first, second, and seventh rectifiers, and across said terminals.

References Cited in the file of this patent
UNITED STATES PATENTS

| | | |
|---|---|---|
| 1,711,101 | Shanck | Apr. 30, 1929 |
| 2,377,591 | Taylor | June 5, 1945 |
| 2,544,523 | Bogdanoff | Mar. 6, 1951 |
| 2,717,355 | Louden | Sept. 6, 1955 |
| 2,790,126 | Fairweather | Apr. 23, 1957 |
| 2,853,674 | Gallatin | Sept. 23, 1958 |
| 2,910,624 | Martin | Oct. 27, 1959 |